(12) United States Patent
Shurtz et al.

(10) Patent No.: US 11,490,315 B2
(45) Date of Patent: Nov. 1, 2022

(54) EMERGENCY CALL ROUTING VIRTUAL TESTING APPARATUS

(71) Applicant: TELEFONAKTIEBOLAGET LM ERICSSON (PUBL), Stockholm (SE)

(72) Inventors: Jack Shurtz, Thornton, CO (US); Sean Bolte, Kansas City, MO (US); Jill Ellis, Lenexa, KS (US); Tim Kelley, Lenexa, KS (US); Melissa Dawn Trinkler Martinecz, Mound City, KS (US); Terrence Phillips, Lawrence, KS (US); Victoria Zeller, Kansas City, KS (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 379 days.

(21) Appl. No.: 16/469,141

(22) PCT Filed: Dec. 12, 2017

(86) PCT No.: PCT/US2017/065908
§ 371 (c)(1),
(2) Date: Jun. 12, 2019

(87) PCT Pub. No.: WO2018/111937
PCT Pub. Date: Jun. 21, 2018

(65) Prior Publication Data
US 2021/0289416 A1    Sep. 16, 2021

Related U.S. Application Data

(60) Provisional application No. 62/433,079, filed on Dec. 12, 2016.

(51) Int. Cl.
*H04W 40/02*    (2009.01)
*H04W 76/50*    (2018.01)

(52) U.S. Cl.
CPC ............ *H04W 40/02* (2013.01); *H04W 76/50* (2018.02)

(58) Field of Classification Search
None
See application file for complete search history.

(56) References Cited

U.S. PATENT DOCUMENTS

| 7,420,963 B1 | 9/2008 | Shankar et al. |
| 8,761,719 B1 | 6/2014 | Hines, III et al. |

(Continued)

FOREIGN PATENT DOCUMENTS

WO    2006021005 A2    2/2006

OTHER PUBLICATIONS

NENA E9-1-1 Wireless Maintenance Call Routing & Testing Validation Standard, National Emergency Number Association (NENA) PSAP Operations & Next Generation Integration Committee, Jun. 5, 2007.

(Continued)

*Primary Examiner* — Kouroush Mohebbi
(74) *Attorney, Agent, or Firm* — Sage Patent Group

(57) ABSTRACT

A system and a method of operating a communication system including a public safety answering point (PSAP). In an embodiment, an apparatus is configured to compare a new configuration for routing an E911 communication to the PSAP employing a new primary communication path from a new cell site sector to a deployed configuration for routing an E911 communication to the PSAP employing a deployed primary communication path from a deployed cell site sector. The apparatus is also configured to demonstrate that a communication from a handset in the new cell site sector can connect to another handset.

20 Claims, 9 Drawing Sheets

(56) References Cited

U.S. PATENT DOCUMENTS

2009/0147926 A1* 6/2009 Fahrenthold .......... H04M 3/323
  379/1.01
2014/0295885 A1* 10/2014 Marko .................. H04W 4/029
  455/456.1

OTHER PUBLICATIONS

ATIS, High Level Requirements for End-to-End Functional Testing, ESIF Technical Report ATIS-0500009, 2005.
ATIS, Maintenance Testing, Technical Report, ATIS-05000010, 2005.
NENA Wireless E9-1-1 Overflow, Default and Diverse Routing Operational Standard, National Emergency Number Association (NENA) Wireless E9-1-1 Overflow, Default and Diverse Routing Wireless Operations Working Group, Nov. 18, 2004.
Telecommunications Industry Association et al., "Joint Standard—Enhanced Wireless 9-1-1 Phase II", J-STD-036-C-1 (Addendum to ANSI/J-STD-036-C), Oct. 2013, 22 pages.

* cited by examiner

EMERGENCY CALL ROUTING VIRTUAL TESTING APPARATUS

This application claims the benefit of U.S. Provisional Application No. 62/433,079 entitled "EMERGENCY CALL ROUTING VIRTUAL TESTING APPARATUS," filed Dec. 12, 2016, which is incorporated herein by reference.

This application is a 371 of International Application No. PCT/US2017/065908, filed Dec. 12, 2017, the disclosure of which is fully incorporated herein by reference.

BACKGROUND

A public safety answering point ("PSAP" completes end-to-end functional testing upon an initial attempt to implement either phase 1 or phase 2 service over a PSAP coverage area or over that portion of a PSAP's coverage area served by an operator. In phase 1 service, a wireless E911 call is delivered with a callback number and identification of the cell site from which the call originated. Call routing is usually determined by a cell site sector. In phase 2 service, a wireless E911 call is delivered with phase 1 requirements plus a location of the handset within 50 meters, 67 percent ("%") of the time and selective routing based upon those coordinates. Subsequent Federal Communications Commission ("FCC") rulings have redefined these accuracy requirements.

The term "E911" as used herein refers to "enhanced 911" service that includes data as well as voice communications. The end-to-end concept contained in end-to-end functional testing highlights two important aspects of E911 call processing including call routing and data delivery from each active cell site sector in the PSAP jurisdiction. Call route testing validates that an emergency call is delivered to the appropriate PSAP without a noticeable delay. Data delivery testing validates that the data provided by the network is sent quickly and accurately to the PSAP customer premises equipment ("CPE").

A high-level network architecture for end-to-end functional testing includes a carrier's network interconnects to a PSAP CPE via direct trunking or through a local exchange carrier ("LEC"), selective router ("SR") and an emergency services message entity ("ESME"), which contains various LEC or stand-alone automatic location identification ("ALI") databases, protocol converters, etc.

Since there are multiple interconnected networks that can modify and interact with the data that is sent from the carrier network, end-to-end testing validates that interconnected networks pass the correct data without additional latency. The ultimate objective of this testing activity is to ensure interoperability between the carrier's wireless service provider network and the emergency services network.

The elements of the E911 location and call routing system are tested. These include a position determining entity ("PDE"), or a serving mobile location center ("SMLC"), a mobile switching center ("MSC"), gateway mobile location center ("GMLC") or a mobile positioning center ("MPC"), ALI, PSAP CPE and connecting interfaces, and all categories of handsets (such as global positioning system ("GPS") equipped, not GPS equipped, initialized, not initialized, roaming, etc.)

The applicable bands/modes are tested during system testing and are periodically checked during field testing. These include verifying the cell and sector for each test call. Testing encompasses both system (profile) and field test phases. In each phase, proper call routing and PSAP data display are verified.

For each test call, the following information is recorded. Data is recorded by the test personnel on a test data spreadsheet or test validation worksheet ("TVW") including recorded information such as the wireless service provider and the serving wireless carrier, the MSC serving the test call (upon which the E911 test calls were made), the name of the person/tester making the E911 test call, the emergency services routing digits/emergency services routing key ("ESRD/ESRK") (which is a 10-digit identifier used to route the call through the network), the cell site identification name or number (cell site sector), the routing PSAP (the name or identifier of the PSAP that the call should route to based on cell site sector or other criteria), the time of the E911 test call, the routing PSAP (the name or identifier of the PSAP that the call routes to), the name/identifier of the PSAP call taker who answers the test call, a callback number (the wireless caller's phone number, if available), a pseudo automatic number identification ("pANI," which is a ten-digit number assigned to support the routing of the wireless 911 call), the address of the cell site as provided and approved by the PSAP (may appear on multiple lines), and the class of service ("COS"). The class of service includes MOBL (class of service abbreviation for a mobile call), WRLS (class of service abbreviation for a wireless call), WPH1 (class of service abbreviation for a wireless phase 1 call) or WPH2 (class of service abbreviation for wireless phase 2 call), which indicates the source of the displayed location information (verification only needs to be done as part of system testing). The information also includes a latitude, longitude and uncertainty of the reported location information, display format (verification that the call back number and location information displays in the correct CPE screen field as part of system testing), pass/fail (designation of the test result), and a comments field (especially for test failures).

For each MSC-to-selective router connection, all applicable call scenarios as listed below are to be tested. Redundant links from the MSC to selective routers are also tested by blocking one link and forcing calls to the other(s). One call scenario is an un-initialized or non-service initialized ("NSI") wireless call. This is an E911 call made from a handset that does not subscribe to any wireless service. The cell sector (also referred to as "cell site sector") data is displayed correctly at the PSAP, but a callback number may or may not be displayed. For NSI handsets, the caller's latitude and longitude may be displayed, depending on the location technology used.

Another call scenario is default routing. The network is set up to force the call to route to the default location. A call from a local wireless handset routes to the proper default location and the caller's callback number and cell sector data is delivered and displayed correctly at the PSAP. The default location may be different than the primary routing destination.

A successful test results in the caller's callback number, cell sector (phase 1) and/or x, y data (phase 2) being delivered and displayed correctly at the PSAP with an acceptable Uncertainty. For a system test to be successful, the data received by the PSAP should match the data sent by the wireless network. Character and enumerated values should match exactly. The difference between received and transmitted numerical values should not be greater than the resolution supported by that field. Field testing verifies that calls made from each cell site and cell sector are routed correctly to the designated PSAP, that the callback number is delivered and displayed correctly on the CPE, that the correct and accurate cell site/sector data is provided along with the call, and for phase 2 the latitude, longitude and uncertainty (where available) of the caller are delivered. System testing should be successfully completed before field testing can begin. Again, a successful test results in the callback number, cell sector data (or latitude and longitude for a phase 2 response) as appropriate, being delivered and displayed correctly at the PSAP.

No call scenario may fail system testing criteria. All call failures are analyzed, appropriate adjustments made, and retested until every call scenario for each MSC and selective router combination successfully passes the system test. The PSAP is notified in writing upon the successful completion of the system testing.

Also, no cell site or sector may fail the field testing criteria. The field test data are analyzed and appropriate network adjustments made. The cell sectors experiencing failures are retested until every cell site/sector successfully passes the field test. The PSAP shall be notified in writing upon the successful completion of field testing. The call data and results are recorded for each test call. The data format is determined by the testing organization.

The data is recorded accurately such that any verification or audit of results is easily achievable. The data is stored in accordance with the established guidelines of the individual company or organization responsible for the testing. Fixed data items are determined in advance. The cell site and sector information, emergency services routing digit, etc., may be recorded prior to testing. The data and results initially received at the PSAP prior to any re-bid, as well as data updates received after a re-bid are recorded, with any differences noted.

The testing documents include a description of testing objectives, a description of the location, technology and air interface tested, a description of the test configuration used (including the test versions of each location network element and handsets used such as gateway mobile location center), a description of test area(s) used (e.g., name of routing PSAP), identification of the cell sectors covered by the test, a description of the "pass-fail" criteria, test summaries and certification, PSAP name, emergency communications wireless E911 deployment summary, number of cell sites tested, overall percent successful, notification and certification letter (including carrier name and number of cell sectors tested), total number of cell site sectors routed correctly, total number of cell site sectors unsuccessfully routed, list of unsuccessful routing (and request for retest), county name, county population, and date of implementation. The data should clearly substantiate carrier results.

Triggers for additional functionality testing include database changes that have the potential to affect call routing and could require functional testing for the PSAP such as new cell sites, re-homes of cell sites from one MSC to another MSC, cell site sector changes, PSAP-initiated routing changes for individual cell sites or groups of cell sites, platform software upgrades that have the potential to affect call routing (simple verification test ("SVT") or random tests), technology overlays (e.g., time division multiple access ("TDMA") to global system for mobile communications ("GSM")), that mobile positioning center ("MPC")/gateway mobile location center ("GMLC") vendors change, and selective router or trunk group changes.

A methodology for functional testing (as described in ATIS-0500010 Section 12, Emergency Services Interconnect Forum ("ESIF") Technical Report entitled "Maintenance Testing," Alliance for Telecommunications Industry Solutions, which is incorporated herein by reference) is, depending on the maintenance event, one of the following tests. This will be performed during or immediately after the event to ensure that end-to-end call routing and location data delivery testing are functioning properly, as described in ATIS-0500009, entitled "High Level Requirements for End-to-End Functional Testing," which is incorporated herein by reference, and can be performed with a simple verification test.

Examples of network maintenance changes that can trigger E911 call testing per ATIS-0500009 requirements for end-to-and functional testing are shown below in TABLE 1.

TABLE 1

| Network Change | Impact on E911 | Test Action | Notes |
| --- | --- | --- | --- |
| New Cell Site | Would go to default routing if not properly provisioned, thus wouldn't be compliant | Requires PSAP call testing | See ATIS-0500009 High Level Requirements for End-to-End Functional Testing. |
| New Cell on Wheels (COWs) | Would go to default routing if not properly provisioned, thus wouldn't be compliant | Requires PSAP call testing | See ATIS-0500009 High Level Requirements for End-to-End Functional Testing. |
| Emergency COW (e.g., response to a natural disaster) | Would go to default routing if not properly provisioned, thus wouldn't be compliant | Requires PSAP call testing | See ATIS-0500009 High Level Requirements for End-to-End Functional Testing. |
| Re-home Base Station to a different MSC | May affect call routing | Requires PSAP call testing | Note: For CDMA this includes cell site number changes. See ATIS-0500009 High Level Requirements for End-to-End Functional Testing. |
| Change of sectorization of a cell site | May affect call routing | Requires PSAP call testing | See ATIS-0500009 High Level Requirements for End-to-End Functional Testing. |
| Changing site information including: | Impact on E911 | Test Action | Notes |
| ESRD, ERN, ESRN, or ICID changes | Call may not route properly | Requires PSAP call testing | See ATIS-0500009 High Level Requirements for End-to-End Functional Testing. |
| Cell site relocation (new or same hardware) | May affect accuracy and routing | Requires PSAP call testing | See ATIS-0500009 High Level Requirements for End-to-End Functional Testing. |

TABLE 1-continued

| | | | |
|---|---|---|---|
| E9-1-1 Selective Router and/or E9-1-1 trunk group changes | Call may not route properly | Requires PSAP call testing | See ATIS-0500009 High Level Requirements for End-to-End Functional Testing. |
| MPC/GMLC service provider changes | May affect accuracy and routing | Requires PSAP call testing | See ATIS-0500009 High Level Requirements for End-to-End Functional Testing. |
| Wireless carrier technology overlays or migration (e.g. TDMA to GSM) | May affect accuracy and routing | Requires PSAP call testing | See ATIS-0500009 High Level Requirements for End-to-End Functional Testing. |

Examples of network maintenance changes that trigger E911 simple verification testing or random call testing are shown below in TABLE 2.

TABLE 2

| Network Change | Impact on E911 | Test Action | Notes |
|---|---|---|---|
| LAC changes (GSM only) | May affect call routing | SVT or Random testing | Monitor any KPIs that are produced by the location infrastructure and logs for 72 hours look for bad routing. |
| Trading Identical Phase 2 Location Hardware in field (network-based systems) | May affect Phase 2 completion | SVT or Random testing | Check each sector. |
| Phase 2 field hardware physical move (network based systems) | Possibly off air and/or less accurate | SVT or Random testing | Monitor KPIs and logs for 72 hours. |
| New software releases for: | Impact on E911 | Test Action | Notes |
| BSC | Normally None | SVT or Random testing | Monitor KPIs and logs for 72 hours. |
| MSC | Normally None | SVT or Random testing | Monitor KPIs and logs for 72 hours. |
| SMLC | Potentially lowered Locations Success Rates | SVT or Random testing | Monitor KPIs and logs for 72 hours. |
| PDE | Potentially lowered Locations Success Rates | SVT or Random testing | Monitor KPIs and logs for 72 hours. |
| MPC/GMLC equipment upgrades | Normally None | SVT or Random testing | May involve new ESRKs. Monitor KPIs and logs for 72 hours. |
| PSAP complaints (e.g. misroutes, low percentage of Phase II responses, partial ALI data) | Misroutes, low percentage of Phase II responses, partial ALI data, etc. | Start with SVT or Random testing and evaluate to determine if further testing is required. | PSAP complaints need to be documented with examples of failed calls. Complaints need to be within a week of issue. |

Examples of network maintenance changes that do not require E911 call testing are shown below in TABLE 3.

TABLE 3

| Network Change | Impact on E911 | Test Action | Notes |
|---|---|---|---|
| Base station re-tune | Normally none, but errors could occur | Normally no testing is needed | Open a vendor ticket if errors occur |
| Changing site information including: | Impact on E911 | Test Action | Notes |
| Site name change | No impact to routing, possibly a data display change. | Normally no testing is needed | |

TABLE 3-continued

| | | | |
|---|---|---|---|
| Site numbering (e.g., C406 becomes A237 in re-home) - for GSM only | No impact to routing, possibly a data display change. | Normally no testing is needed | |
| Latitude/longitude coordinates | No impact to routing, possibly a data display change. | Normally no testing is needed | This applies to latitude/longitude fine tuning, not a cell site move. |
| Antenna model, antenna AGL, and azimuth changes | Normally does not impact routing, but could affect location accuracy | Normally no testing is needed | Monitor Key Performance Indicators (KPIs) and check accuracy tests when performed |
| Receive coaxial path changes | Normally does not impact routing, but could affect location accuracy | Normally no testing is needed | Monitor Key Performance Indicators (KPIs) and check accuracy tests when performed |
| Phase 2 Location equipment receive path changes (MPC/GMLC) | Normally no impact | Normally no testing is needed | Following the announcement of new release, monitor logs and KPIs These are E9-1-1 nodes that affect all sites at the same time. |

The simple verification test is a statistical measurement that determines that there is less than one chance in twenty that there is an outage. After a network change, the simple verification test can be used to quickly determine that the emergency services call-handling capability of the network is working. In a phase 1 or phase 2 E911 service area, the simple verification test can be used to quickly establish that service to the PSAPs is working normally. An example simple verification test procedure is shown below in TABLE 4.

When a simple verification test is an appropriate test is shown below in TABLE 5.

TABLE 5

| SVT is Appropriate for . . . | SVT is Inappropriate for . . . |
|---|---|
| SMLC/SMPC software upgrades TDOA system software upgrades (WLG) RNC BSC software upgrades | Switch rehome (potentially impacts each sector) MSC-table changes including LAC-CID and ESRN |

TABLE 4

| Step | Action | Note/Comment |
|---|---|---|
| 1 | On the impacted network node or E9-1-1 equipment node, the carrier selects four (4) cell-site sectors from the list of sites impacted by the software change. The market team identifies which handset technologies (AMPS, CDMA, GSM, TDMA, UMTS) are impacted. | Be certain that the cell-site selection includes all impacted technologies: AMPS, CDMA, GSM, TDMA, and UMTS. Simulator works with both GSM and UMTS networks. Test no more than one sector per site. |
| 2 | The field tester places an E911 test call from each of the four sample sectors for each handset technology. | Use appropriate handset and/or test device to originate a 911 test-call. |
| 3 | Wireless 911 personnel validate that each test call displays the correct 911 information for each level of 911 service tested. If the required number of tested sectors operates correctly and displays the correct information on the PSAP display and/or test tool, the 911 network passes the SVT. Test failure is a non-normal condition to be referred to operations and/or the vendor of the changed node. | Test criteria per impacted network node or E9-1-1 equipment node: Four successful calls on four randomly selected sectors is a PASS. If more than one call fails to provide the proper 911 information during the initial four test calls, the test fails. If only one call fails out of the initial four calls, make four additional calls. If calls five through eight are successful, then the testing is deemed successful. If any calls in the second set of four fail, the testing is deemed unsuccessful. Consult the SMEs for the impacted network node or E9-1-1 equipment node. If the problem persists and cannot be resolved during the maintenance window, initiate back-out procedures to restore operational functionality and the compliance of the 911 network. |

TABLE 5-continued

| SVT is Appropriate for . . . | SVT is Inappropriate for . . . |
|---|---|
| SMLC restoration (following an outage) | GMLC hardware or link changes |
| MSC upgrade or recovery | ALI trunk changes (must be live-call tested) |
| GMLC software upgrades | |

To illustrate limits of a simple verification test, it is noted that the simple verification test is designed to be simple and easily performed in the field by technicians and monitored on a local or remote basis within important limits as described below. Assumptions in using a simple verification test include if the system was working normally prior to a software, hardware or network change being tested. The following assumptions apply including the wireless network is a working phase 1 or phase 2 market that had been handling emergency service calls normally, the radio access network and core E911 nodes are operational and alarm free, and for phase 2, the location hardware was returning valid phase 2 responses to the serving PSAP prior to the change under test.

The simple verification test considerations include if the operational condition of the network has changed after the first office Acceptance ("FOA") release or software upgrade has been applied, if the sites are still performing as they performed before the upgrade, and if the quality of the service cannot be determined. The test may not provide information about impacts to quality parameters.

The simple verification test method is based on a statistical quality control method call Bayesian analysis. Four successes out of four attempts show the likelihood to be less than 5 percent ("%") difference. Seven successes out of eight attempts show the likelihood to be less than 10% difference. The above percentages are acceptable risks. The simple verification test may not check E911 accuracy or provide a true estimate of location completion percentages.

For random call testing, a selection of a random number of cell sites in the area affected by maintenance, representing approximately 10% of the total cell sites. End-to-end functionality testing is performed on the selected cell sites. If successful, call monitoring is performed for 72 hours post activities.

Testing documentation, test data, test call results, and end-to-end functional testing are documented and maintained. All calls are documented and classified per their results. Failed or dropped calls are documented and the test call repeated until a successful result is obtained. Success criteria result in the caller's callback number, cell sector (phase 1) and/or x, y data (phase 2) is delivered and displayed correctly at the PSAP. For an end-to-end functional test to be successful, the data received by the PSAP should match the data sent by the wireless network without material alterations.

TABLE 6 below illustrates example sample sizes for random call testing.

TABLE 6

| Established Mean μ (meters) | Established Standard Deviation σ (meters) | Minimum Sample Size n for Different 90% Confidence Intervals | |
|---|---|---|---|
| | | +/−15% of μ | +/−20% of μ |
| 30 | 20 | 54 | 31 |
| 40 | 80 | 482 | 271 |
| 90 | 125 | 232 | 131 |

For maintenance testing, at any time after end-to-end functional testing and field testing have been successfully accomplished, maintenance testing would be applied in the following scenarios including a new cell site (post phase for phase 2 deployment), the number of sectors on a tower is changed (e.g., going from omni to 2 or 3 sectors), the orientation of sectors is changed to an extent that it may affect call routing decisions or change the sector direction displayed to the PSAP, re-homes of cell sites from one switch to another, a new air interface technology is employed (e.g., TDMA to GSM), and changing mobile positioning center ("MPC") service providers.

A PSAP approved test verification worksheet is distributed to the party or parties performing the testing on the new cell site sector. A test call window is then scheduled with the drive technician making the calls, and the PSAP receiving the calls. Other parties may also be included if problems occur and research has to be done. These parties may include the third party routing and location provider, the automatic location identification database ("ALI DB") provider, the E911 selective router provider/local exchange carrier, and the PSAP customer premises equipment provider including the PSAP's computer aided dispatch ("CAD") and computer aided mapping ("CAM") systems.

The E911 test calls are made from within the service area of the cell site sector being tested on a provisioned handset, where a provisioned handset is one that is on an active account on the carrier's network, or on a non-provisioned (not initialized) handset is one that has been taken freshly from the box, and has not been initialized on a customer's account. The E911 test calls are executed by a driving to a test location for MSC-selective router testing. The MSC and the selective router are entered on the system test worksheet prior to the test. A technician from an initialized local wireless handset dials 911 or the pre-arranged test number, and when the call is answered identifies the call as a "TEST CALL." If the call taker is not able to take the test call at that time, the call is terminated and a note is made to call back later. If the call taker is able to take the test call at that time, the technician asks the attendant to identify the name of the PSAP, which is entered on the system test worksheet. The time of the test call and the name of the PSAP attendant who answered the call are also entered on the system test worksheet.

The technician verifies with attendant the call back number, pANI (ESRD/ESRK), wireless service provider ("WSP"), and phase 1 cell/sector address fields are populated and results recorded. If the class of service is wireless service provider phase 2 capable, the technician verifies that x, y (latitude and longitude) coordinates and uncertainty (if available) are also populated. If the system is phase 2 capable and the class of service is not wireless service provider phase 2, the technician asks the operator to re-bid after approximately 30 seconds as recommended. Once the re-bid is completed, the class of service is verified. If wireless service provider phase 2, the x, y coordinates and uncertainty are populated. If not, the operator re-bids once again after approximately 30 seconds and again verifies the class of service.

For each test call, the technician notes whether the test passed or failed. A successful test result routes the call to the proper PSAP and populates the callback number, pANI, service provider and phase 1 address fields correctly. If a test call fails, a second call is performed. If the second call is again unsuccessful, the technician shall move to another location in the cell sector until a test call can be made successfully. The technician repeats the steps above for each additional call scenario, signs the worksheet after information has been entered in each category for the test call, and retains all worksheets for analysis and archiving.

The data is manually captured by the technician and possibly the PSAP, and recorded on a test validation worksheet. The manual testing is judged against the criteria on the form as to whether the call "passed" or "failed." If the site "passed," the information collected is retained, and for a predetermined duration set by the testing wireless service provider's compliance department. If the site "failed," the issues are researched, resolved, and the testing cycle restarted until a passing grade is achieved.

As a result, a substantial amount of manual testing is performed with current practices by a technician that makes multiple E911 phone calls from a physical coverage area for each cell site sector of a new cell site. A process that will greatly reduce this work load including work performed by call takers and operators at a PSAP would address a cost and performance limitation. In addition, there is in need to lessen the amount of time spent between cell site readiness and actual deployment into the network for call processing of a new cell site and/or sector. Confirming emergency call alternate and default route configurations for a new cell site and/or sector that is not yet tested during standard deployment call testing would address a further deficiency.

SUMMARY

These and other problems are generally solved or circumvented, and technical advantages are generally achieved, by advantageous embodiments of the present invention for a system and a method of operating a communication system including a public safety answering point ("PSAP"). In an embodiment, an apparatus is configured to compare a new configuration for routing an E911 communication to the PSAP employing a new primary communication path from a new cell site sector to a deployed configuration for routing an E911 communication to the PSAP employing a deployed primary communication path from a deployed cell site sector. The apparatus is also configured to demonstrate that a communication from a handset in the new cell site sector can connect to another handset.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different figures generally refer to corresponding parts unless otherwise indicated, and may not be redescribed in the interest of brevity after the first instance. The FIGUREs are drawn to illustrate the relevant aspects of exemplary embodiments.

DETAILED DESCRIPTION

Figure 1A:
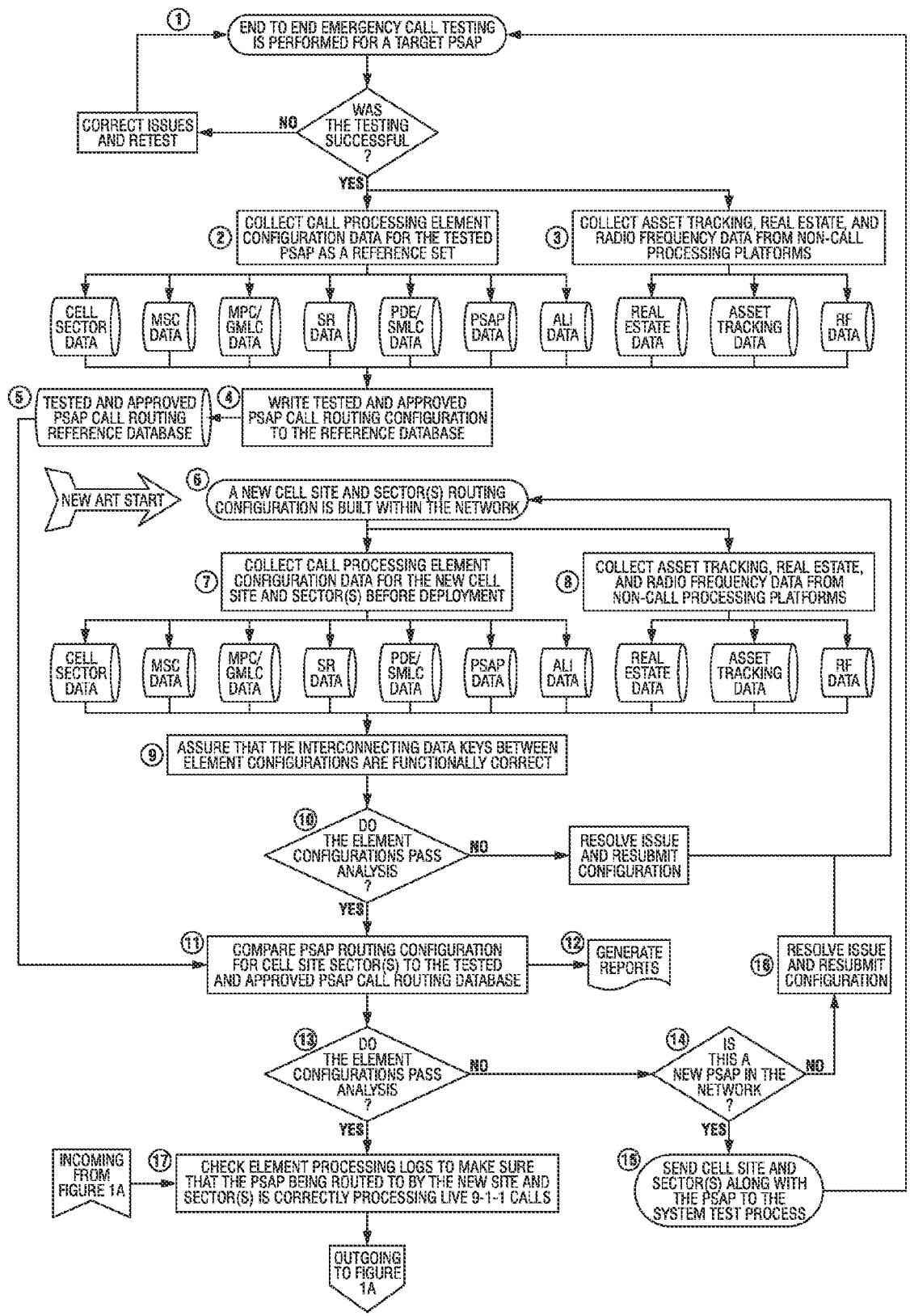
FIGS. 1A and 1B illustrate a flow diagram of an embodiment of an emergency call routing virtual testing operation.

The making and using of the present exemplary embodiments are discussed in detail below. It should be appreciated, however, that the embodiments provide many applicable inventive concepts that can be embodied in a wide variety of specific contexts. The specific embodiments discussed are merely illustrative of specific ways to make and use the systems, subsystems, and modules to perform E911 call testing in the deployment of new cell sites into an established network with proven and functioning connectivity to a target public safety answering point ("PSAP"). While the principles will be described in the environment of a 3GPP2 code division multiple access ("CDMA") communication system, any environment such as, without limitation, "3G," "4G," Long Term Evolution ("LTE"), "VoLTE," "NR" (New Radio), and Wi-Fi wireless communication systems is well within the broad scope of the present disclosure.

The present testing solutions are limited due to factors such as default and alternate (overflow) paths are not retested post end-to-end functional testing unless a customer call failure occurs or the terminating number is changed. The E911 call routing configuration and primary call path is only tested once. Once a cell site sector has passed testing, it is rarely if ever tested again unless a service impairing event triggers needed calls or network event requiring testing occurs. While provisioned GPS handsets are tested, advanced forward link trilateration ("AFLT"), non-initialized or roamer handsets are not tested. The tested cell site sector is not verified other than location description contents confirmed at the PSAP CPE. Multiple points of failure occur due to human error. Only one handset on one sector is confirmed using one ESRK to one trunk; one ALI record for address and callback number is retrieved on the day that testing was performed. The drive technician's knowledge base can be extremely variable, leading to different results for the same testing procedures. For a simple verification test, the utilization assumes that the system is working prior to any changes in the network or PSAP. With the simple verification test, the quality of service or parameters are not identified. The simple verification test is based on a statistical quality control method and does not provide actual measurements of the PSAP/cell sector quality. The simple verification test accepts 5 to 10 percent statistical differences in data. For random call testing, it only validates a small percentage of the PSAP coverage area and is based on statistical data, not actuals. Random call testing expects call monitoring for 72 hours. This practice in the field is very rarely accomplished.

From a documentation perspective, the present testing solutions are limited due to factors that the documentation is vague on technical and functionally tested elements and configurations, manual (subject to human error), and contains no details of what is checked and is not standardized or consistent between carriers. A database of records can be in systems where reporting is not capable or functional, and require locating the particular activity for which the testing was conducted to locate the uploaded documentation. Secondary audits to verify drive test data is tedious and time consuming requiring specialized knowledge of the call processing entities, and the logging of past events. Also, failed call data is rarely recorded and documented.

From a cost perspective, the present testing solutions are limited due to factors such as the PSAP resources are occupied with test calls instead of answering real emergencies driving up tax payer costs. Certain activities that require functional testing for maintenance are not always achieved due to cost, including re-homes, cell sector or site changes, PSAP initiated routing changes, and platform software changes.

Increasing network speed and bandwidth causes decreased site coverage and requires additional sites to be brought on air to ensure the same coverage area. Considering exponential increases in E911 testing impacting the PSAP, current testing standards will soon overwhelm the PSAPs. The testing diverts PSAP personnel from public safety services. Delays in deployment and E911 services turn up as field-based single test calls cannot meet volumes and deployment times needed to meet commercial and public safety demands (public/private). Repeated testing done on cell site sectors that were not configured correctly can be expensive in both resources and valuable time. There are also limited testing windows available in some PSAP jurisdictions, so new cell site testing would have to be pushed back or rescheduled.

As introduced herein, an apparatus utilizes confirmed E911 call routing and delivery testing that was performed per industry best practice and published standards from when the PSAP was first implemented in the carrier and public safety networks. The end-to-end configuration for the tested cell site sectors including the collected configuration of the call routing and delivery nodes is saved, maintained to a current operational active state, and referenced as a standard for comparison for any new cell site sectors deployed into the network that route to the same PSAP. The referenced configuration includes the variations that deliver calls based on the routing keys, routing diversity, and alternate (overflow)/default conditions. The relevant configuration data of a new cell site sector being deployed are exhaustively compared against the referenced configuration and each individual processing node's configuration standards. Uniqueness between nodes, carriers, and users associated to data entry, standards, and network configurations, demands specialized understanding for data comparisons that requires exclusive definitions per component. The apparatus reports cell site sectors that pass the referenced comparison. It also provides failure reporting based on comparison and/or node standard configuration practice. This logical configuration comparison replaces a need for physical testing currently performed on every cell site sector at a time of deployment. The use of "big data" analytics performed against active state operational relational data from sources of call flow and databased data assure proper documentation, standardized methods, and on-demand repeatability without impacting regular PSAP operations.

The apparatus performs detailed exhaustive "big data" analytics of a substantial number, which may include, without limitation, at least 250 configuration comparisons, to verify compliance for operational readiness (e.g., a cell site sector is "on-air" ready). The apparatus replaces field-based testing, provides compliance readiness reporting, provides auditable level compliance in lieu of and equivalent to field test data archiving. The paths (including primary, secondary such as alternative/overflow paths, and defaults) are repeatedly compared and maintained. Provisioned and non-initialized handset provisioned data are included in the comparisons. The cell site sectors routing to the PSAP configuration are included in the comparisons. The data comparisons are executed through automation in real time, thereby eliminating human error that can occur during physical drive testing. The comparisons are achieved for the emergency services routing keys for trunking, ALI, and address configurations of the PSAP. The apparatus automation removes variability in results that may be seen due to drive technician's lack of knowledge or experience.

For a simple verification test, the apparatus removes assumptions that the system is working prior to any changes in the network due to the repeated data comparisons and maintaining of the current operational active state of the PSAP. The working configuration of the network is known. The apparatus identifies the quality of service and/or other parameters within the virtual testing method. Data is based on actual data comparison measurements and not on statistical data of the PSAP and cell sector quality.

For random call testing, the apparatus validates the PSAP coverage area and is based on actual measurements and data, not on statistical data. There could be less demand for post-call monitoring when using the apparatus; however, the apparatus can be configured to include post-call monitoring automatically.

For documentation, data comparisons completed via the apparatus are detailed and include identification of technical and functional virtually tested elements and configurations. Automation eliminates a human error factor in accurate documentation of site operational readiness compliance. The documentation output is consistent and can be standardized across carriers and networks if necessary. The documented data is archived, reported on and readily searchable. Secondary audits become less important with the introduction of the apparatus and "big-data" analytics. Failed comparison of virtual test data is documented and archived.

From a cost perspective, PSAP resources are able to focus on real time emergencies instead of time-consuming test calls. Maintenance activities can achieve the functional testing either through virtually test methods through the apparatus for significant cost reduction or through existing test methods due to the overall reduction in physical drive testing. The PSAP impact would be less impeding in achieving functional testing for events for, without limitation, re-homes, cell sector/site changes, PSAP initiated routing changes, and platform software changes.

Additional sites can be brought on-air expeditiously, ensuring better coverage and improved 911 service areas, thereby achieving reduced impact to the PSAPs instead of increased, debilitating impact to the PSAPs. A significant reduction in time to market for 911 services is achieved to support increased volumes and deployment times meeting or exceeding commercial and public safety demands (both public and private). Repeat testing should be reduced if needed at all as the apparatus proactively identifies if the cell site sectors are not configured correctly. Physical testing could be very limited, as repeat testing becomes unnecessary. PSAP limited testing windows would not impede or impact network and 911 service delivery schedules.

Advantages of the apparatus introduced herein include automation of the present testing methodologies by replacing the need to have a technician make multiple E911 phone calls from the physical coverage area for the cell site sector. The apparatus utilizes previous call data and end-to-end call processing node configuration data to validate the cell site sector's E911 compliance.

The possible call routes are repeatedly verified through the validation process including those utilized because of logical or physical issues with the primary path (also referred to as "primary communication path"). Physical call testing for the below routes can be conducted during the first deployment of the PSAP in a carrier's network. To test the routes post first time with end-to-end functional testing, the primary path delivering full functionality to the PSAP would have to be impaired or removed during testing to generate the scenario. This creates an outage condition for the PSAP on the carrier's network for the duration of the testing. Thus, the apparatus also allows the paths of call routing to be virtually tested while physical calls are able to test the primary path, thereby providing route diversity, alternate/overflow paths, and default paths.

The quantity of emergency services routing keys assigned to each PSAP for call routing can range from a few to hundreds. The apparatus tests the emergency services routing keys assigned to the PSAP repeatedly, assuring a call utilizing any number in the range will complete to the desired PSAP. While the physical call testing is usually performed only once if the cell site sector passes the validation process, the apparatus can perform the validation of a single cell site sector, or all cell site sectors, for one PSAP or all PSAPs on a regular or repeated basis.

The use of the apparatus can greatly limit the need for physical call testing having an economic impact for the carrier by limiting the time and resources required for E911 testing. The carrier will also gain through time savings since the testing no longer requires the scheduling of technicians and PSAP personnel to monitor the calls. There is an environmental gain because the number of hours spent on the road in vehicles to complete the E911 testing is greatly reduced thus saving fuel and eliminating emissions. A standardized method of testing and delivery of reporting will make the tracking of cell site validation more efficient, consistent, and reliable. The PSAP personnel can concentrate on actual emergency calls without the distraction and resource constraints caused by physical E911 call testing. The end-to-end functionality is repeatedly validated through virtual testing.

The apparatus holds the advantages of achieving repeated, systematic virtual testing compared to the unattainable repeated and costly physical drive testing. It enables technology introduction to reach the public sooner, shortening delays in technology upgrades and improving the public welfare. It provides value and benefits to PSAPs, carriers and the public. It reduces PSAP resources for 911 testing resulting in benefits to taxpayers.

Figure 1B:
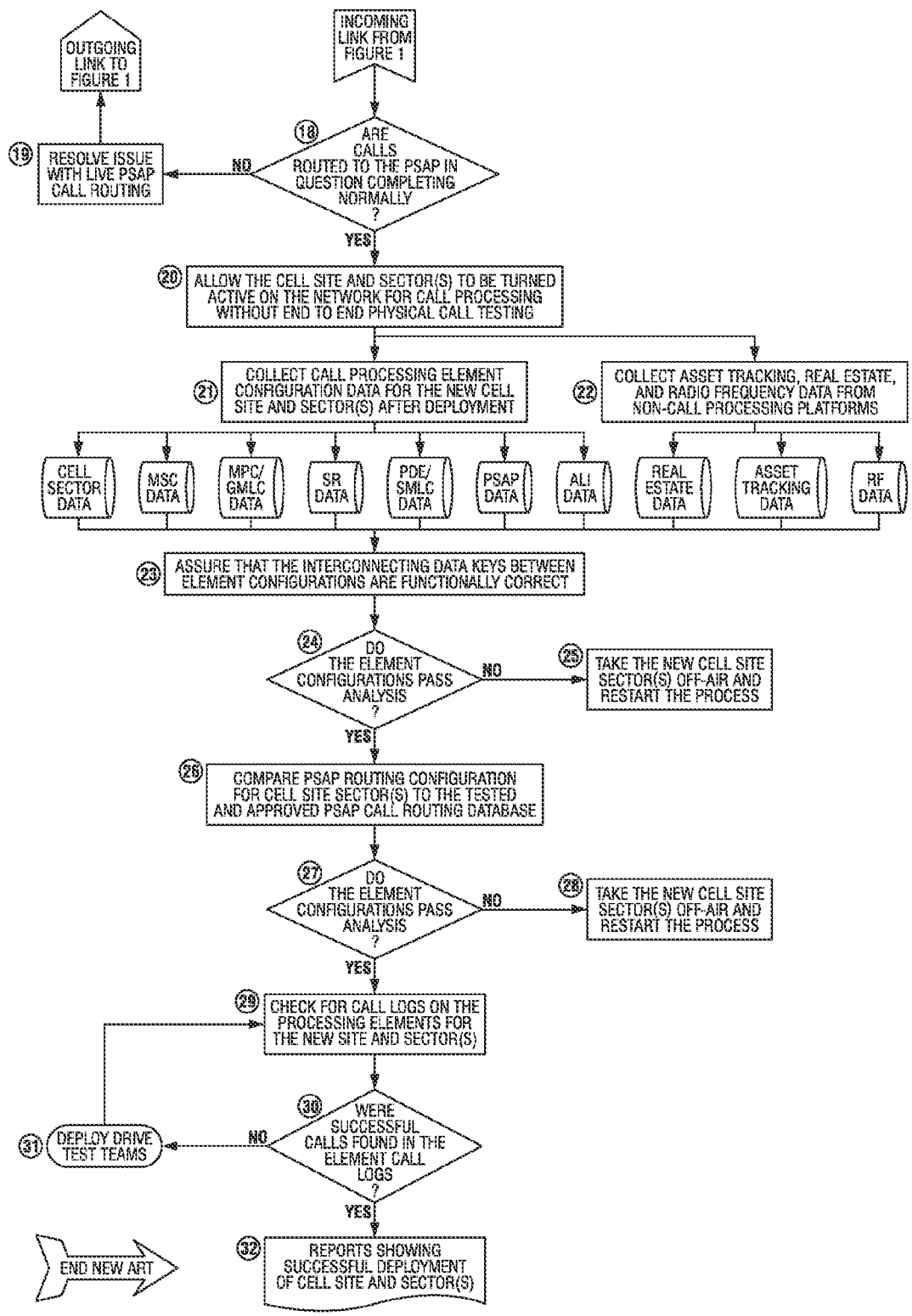

Turning now to FIGS. 1A and 1B, illustrated is a flow diagram of an embodiment of an emergency call routing virtual testing operation. At a step 1, when a new PSAP is added to a carrier's network for emergency call routing (9-1-1), a set of live E911 test calls are placed between a cell site sector with a coverage area that falls within the PSAP's jurisdictional boundary. Calls are made to test the possible routing scenarios including primary routed calls, default routed calls, alternate or secondary routed calls, and calls sent to treatment. Voice trunks are busied out to simulate outage conditions so that the configured trunk group/trunk group members are tested. Multiple calls are made to test that the automatic location identification database shell records are built for the emergency service routing keys or pseudo automatic number identification numbers that are associated to the PSAP for routing. The PSAP personnel verify that the information received from the serving cell sector matches the expected information and display format. The rebid function is also tested to assure that the address information is updated with an acceptable set of geographic coordinates from either a global positioning system, or a radio frequency triangulated location fix.

At a step 2, the configuration data from the call processing elements is collected and placed in a relational database. The data includes, without limitation, cell sector data that come from several elements along the communication path. Some may come from the base transceiver station ("BTS"), the mobile switching center, the position determining entity, or the serving mobile location center. The data will include things like the azimuth of the cell sector, the beam width of the sector, the down tilt measurement on the antenna, antenna height, signal strength, the frequency, and the bandclass utilized, etc. The information that will be pulled from the mobile switching center will include the information to send the origination request to the call routing provider, and the trunking configurations to route the call when the routing digits are received from the routing provider equipment. This equipment may be a mobile positioning center or a gateway mobile location center, etc. The routing equipment will have configuration files that link the PSAP jurisdictional boundaries with the coverage areas of the cell site sectors. It also has the information based on agreements for where the cell site sector coverage area crosses over more than one jurisdiction. The configuration will have the PSAP identification, and the ESRKs, or pANI numbers that can be utilized for call routing. The selective router configuration data will have the final leg of the trunking to the PSAP CPE. The PDE/SMLC, PSAP data, and the ALI elements deal with the delivery of location and caller information.

At a step 3, equipment asset information, real estate information, and radio frequency planning information can be collected from non-call processing equipment and databases for the PSAP configuration that has been tested and accepted. This data will include information about the cell sites physical address, equipment vendors and software load information, and radio frequency information about neighboring cell sites, etc. All of this information can be important in documenting a status of the cell site, and troubleshooting in the future.

At a step 4, all of the data collected about the PSAP's tested and accepted configuration will be loaded into a relational database with multiple keys (PSAP name, FCC PSAP identification ("ID"), ESRK or pANI range, etc.) The data in the database will be checked against multiple quality parameters to ensure that the internal element database key linkage rules are followed, and that the logical configuration can be utilized as a reference set.

At a step 5, the reference database is an aspect of the apparatus. It will be either on the same platform, or on closely associated with the solution itself. At a step 6, a new cell site and/or sector(s) routing configuration is built within the network, but it isn't placed on-air. The site is staged for the emergency call routing virtual testing apparatus. Since the apparatus checks all of the configured cell site sectors, the new site will now be part of the regularly scheduled (default is daily) analysis.

At a step 7, as with the step 2, the call processing element configuration for the new site sector(s) will be collected and correlated for comparison with the PSAP routing reference data in the database. At a step 8, as with the step 3, the non-call processing element configuration for the new site sector(s) will be collected and correlated for comparison with the PSAP routing reference data in the database.

At a step 9, each of the steps in the configuration will be checked to make sure that they meet up with the expected standard configuration for the processing element type (e.g., MSC, MPC, GMLC, etc.), and that the configurations meet the expected standard configuration for the element vendor (e.g., Ericsson, Nokia, Samsung, etc.). The vendor standards are generally proprietary in nature.

At a step 10, if the configuration passes the analysis, then the site is allowed to move on to the next step in the configuration analysis. If not, the site is sent back to the step 6 where it's issues will need to be resolved, and resubmitted for analysis. At a step 11, the next level of analysis matches up all of the configurations for the cell site sector routing to the PSAP with the reference data for that PSAP's routing. The only difference that should be found is the cell site sector's identification. Everything else is based on the ESRKs or pANIs associated with the PSAP, and should match the reference configuration.

At a step 12, reports will be generated based on the comparisons, and the vendors associated with the equipment types. These reports will either show that everything matched, and the cell site sector is ready to move to an on-air status, or the reports will show what needs to be addressed so that the cell site sector will pass on the next analysis run. At a step 13, if the configuration passes the analysis, then the site is allowed to move on to the next step in the configuration analysis. If not, the site is sent back to the step 6 where it's issues will need to be resolved, and resubmitted for analysis or testing for a new PSAP.

At a step 14, if the configuration fails the analysis, then the cell site sector(s) configuration is checked to see if it is for a new PSAP that needs to go through the end-to-end emergency call testing process. At a step 15, the cell site sector(s)/PSAP configuration is for a new PSAP. The configuration has passed the analysis for meeting the standards for the type and vendor of the configuration, and thus needs to be moved into the process at the end-to-end emergency call testing point at the step 1.

At a step 16, the cell site sector(s)/PSAP configuration is not for a new PSAP. The configuration is failed and sent back to the beginning of the process at the step 6. At a step 17, check the live call data for the PSAP for which the new site is being deployed to assure that the sites associated with the PSAP are processing calls correctly, and that the location data being provided is appropriate for the PSAP's expectations.

With continuing reference to FIGS. 1A and 1B, at a step 18 calls that pass the live call analysis are sent on to the next step, or sent back to have the issues resolved with live call processing. At a step 19, resolve the issues with the live call processing for the PSAP, and reinitiate the process at the step 17. At a step 20, make the changes in the tables of the mobile switching center that allow for the cell site sector(s) to process calls and be listed as on-air.

At a step 21, as with the step 2, the call processing element configuration for the new site sector(s) will be collected and correlated for comparison with the PSAP routing reference data in the database now that the site is on-air. At a step 22, as with the step 3, the non-call processing element configuration for the new cell site sector(s) will be collected and correlated for comparison with the PSAP routing reference data in the database now that the site is on-air.

At a step 23, each of the steps in the configuration will be checked to make sure that they meet up with the expected standard configuration for the processing element type (e.g., MSC, MPC, GMLC, etc.), and that the configurations meet the expected standard configuration for the element vendor (e.g., Ericsson, Nokia, Samsung, etc.). The vendor standards are generally proprietary in nature. This will assure that nothing has been changed during the process to place the cell site sector on-air.

At a step 24, if the configuration passes the analysis, then the site is allowed to move on to the next step in the configuration analysis. If not, the site is sent back to the step 6 where it's issues will need to be resolved, and resubmitted for analysis. At a step 25, since something has changed since the cell site sector(s) PSAP configuration was approved, the cell site sector(s) will need to be taken off-air, and the entire process restarted at the step 6.

At a step 26, the next level of analysis matches up all of the configurations for the cell site sector routing to the PSAP, with the reference data for that PSAP's routing since the cell site sector(s) were placed on-air. The only difference that should be found is the cell site sector's identification; everything else is based on the ESRKs or pANIs associated with the PSAP, and should match the reference configuration.

At a step 27, if the configuration passes the analysis, then the site is allowed to move on to the next step in the configuration analysis. If not, the site is sent back to the step 6 where it's issues will need to be resolved, and resubmitted for analysis or testing for a new PSAP. At a step 28, since something has changed since the cell site sector(s) PSAP configuration was approved, the sell site sector(s) will need to be taken off-air, and the entire process restarted at the step 6.

At a step 29, check the call processing logs on all elements to assure that calls are being processed correctly, and the appropriate location information is being generated for calls placed on the new cell site sector(s). At a step 30, confirm that calls are processing normally. If they are, then allow the workflow to move on to the final documentation step. If not, there may not have been any live E911 calls made on the network since the new cell site sector(s) have been placed on-air.

At a step 31, since no calls have been made on the new cell site sector(s), drive test teams are deployed to make physical/live calls via E911 to the PSAP to confirm that everything is working correctly. At a step 32, confirmation reports will be generated showing all steps of the confirmation process. These reports will include the compliance data required by the standards bodies and the regulatory agencies proving that the deployment of the new cell site sector(s) have met all expectations that will be outlined by the National Emergency Number Association, the Telecommunications Industry Association, the Alliance for Telecommunications Industry Solutions, etc. These reports will be saved in a database within the apparatus for a time frame determined by the compliance organizations for the industry, and the client carrier.

Figure 2:
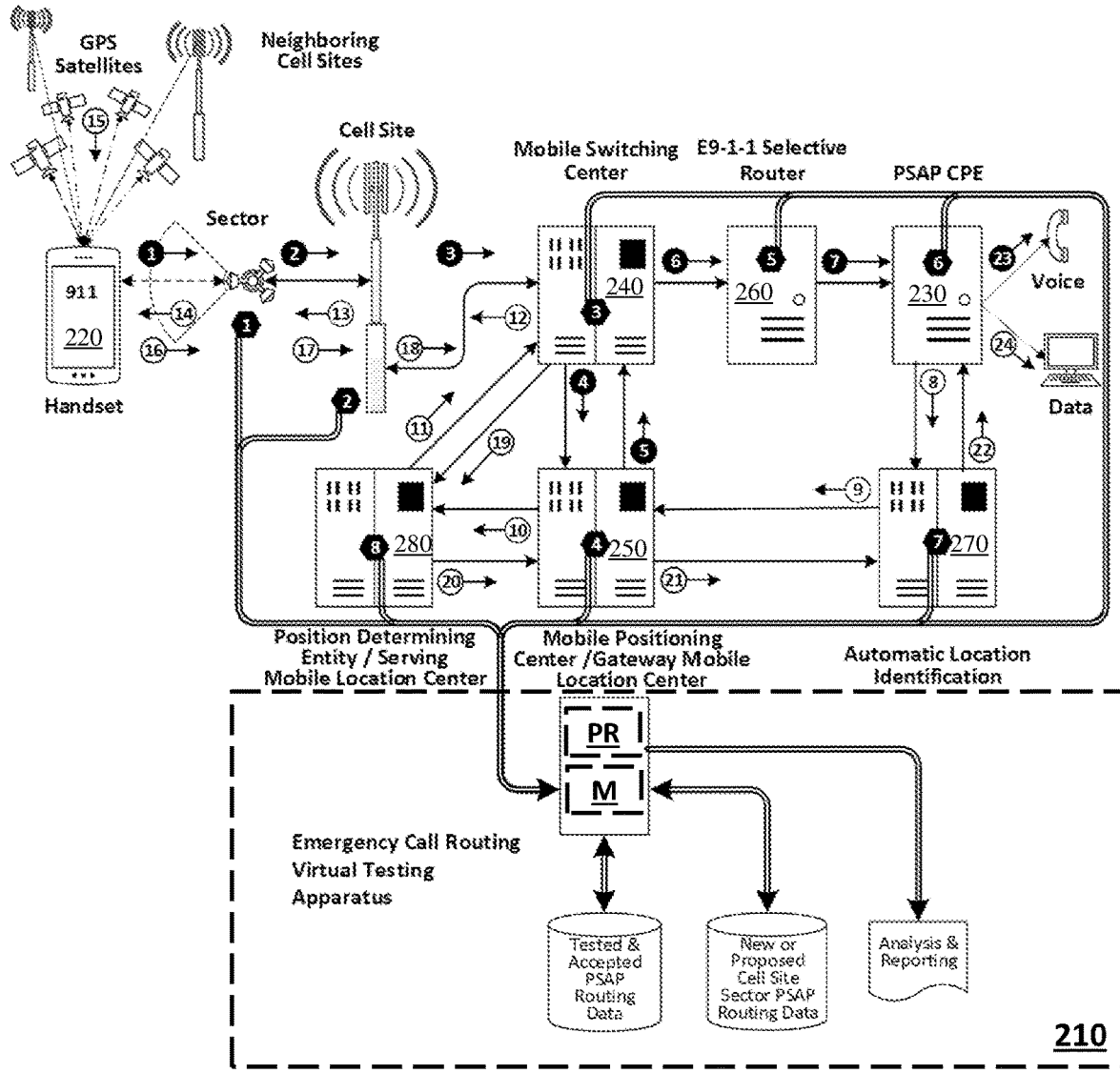
FIG. 2 illustrates a system level diagram of an embodiment of a communication system demonstrating a voice path for an E911 communication.

Turning now to FIG. 2, illustrated is a system level diagram of an embodiment of a communication system demonstrating a voice path for an E911 communication. An apparatus 210 includes a processor PR and a memory M operable in a communication system 200. In particular embodiments, some or all of the functionality described herein as being provided by user equipment ("UE")/handsets, devices, and/or any other types of wired or wireless communication devices 220 may be provided by the device processor PR executing instructions stored on a computer-readable medium, such as the memory M shown in FIG. 2. Alternative embodiments of the wired or wireless communication devices 220 may include additional components beyond those shown in FIG. 2 that may be responsible for providing certain aspects of the device's functionality, including any of the functionality described herein and/or any functionality necessary to support the solution described herein.

The processor or processing circuitry PR may be of any type suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples.

The memory M may be one or more memories and of any type suitable to the local application environment, and may be implemented using any suitable volatile or nonvolatile data storage technology such as a semiconductor-based memory device, a magnetic memory device and system, an optical memory device and system, fixed memory and removable memory. The programs stored in the memories may include program instructions or computer program code that, when executed by an associated processor, enable the respective communication device to perform its intended tasks. Of course, the memories may form a data buffer for data transmitted to and from the same. Exemplary embodiments of the system, subsystems, and modules as described herein may be implemented, at least in part, by computer software executable by processors, or by hardware, or by combinations thereof.

The UEs/handsets 220 and cell sites may be formed with transceivers configured to transmit and receive a wireless communication. The transceivers modulate information onto a carrier waveform for transmission by the respective communication device via the respective antenna(s) to another communication device. The respective transceiver demodulates information received via the antenna(s) for further processing by other communication devices. The transceiver is capable of supporting duplex operation for the respective communication device. The network interface performs similar functions as the transceiver communicating with a core network.

As illustrated in FIG. 2, the emergency call routing virtual testing apparatus (the apparatus 210) is configured to compare a new configuration for routing an E911 communication to a PSAP (generally designated 230) employing a new primary communication path from a new cell site sector to a deployed configuration for routing an E911 communication to the PSAP 230 employing a deployed primary communication path from a deployed cell site sector. The apparatus 210 is also configured to demonstrate that a communication from a handset in the new cell site sector can connect to another handset.

To establish an E911 voice communication path (or voice path), the steps described below are performed in conjunction with steps performed in caller and location data acquisition. Voice path establishment steps are illustrated in FIG. 2 by numbers in solidly filled circles. Steps associated with caller and location data acquisition are illustrated by numbers in circles that are not solidly filled and are described hereinbelow.

In a step 1, a handset user dials 9-1-1. In a step 2, the dialed digits are received by a cell sector antenna. In a step 3, the request is forwarded from the cell site to a MSC 240 including the cell site and sector identifiers, dialed digits (9-1-1), mobile directory number ("MDN") or call back number ("CBN"), mobile identification number ("MIN"). The electronic serial number ("ESN") is also used for the handset 220 to use in the case that the handset 220 has not been provisioned on the carrier's network yet.

In a step 4, the MSC 240 takes the information from the cell site and sector and formats it into an origination request ("ORREQ") and sends it to the appropriate mobile positioning center or gateway mobile location center 250. The switch designation is added to the data for the cell site and sector data as well as the information from the handset 220.

In a step 5, the MPC or GMLC 250 performs a set of database look-ups based on the data provided in the ORREQ and determines the PSAP services for the coverage area associated with the cell site sector. The serving PSAP 230 has a set of pANI or ESRKs represented by a 10-digit number. One of the 10-digit numbers is selected from the set assigned to the PSAP 230 and it is returned to the MSC 240 in an origination request along with other information that assists in the setup of the voice communication path between the caller and the PSAP 230.

In a step 6, the MSC 240 takes the information returned from the MPC or the GMLC 250 and utilizes it to establish the trunking between the caller and the next element in the path known as the selective router 260. The ESRK, or the pANI 10-digit number is utilized in the same way as the digits dialed in a regular person to person call. The digits are associated with a trunk group ("TG") and a trunk group member ("TGM"). There is information in the ORREQ that aids in the assignment of trunk attributes, and message format so the selective router 260 will be able to route the call down the final communications leg to the PSAP 230.

In a step 7, the selective router 260 will service multiple PSAPs. The connection request from the MSC 240 will provide the ESRK or pANI a 10-digit number and message formatting information so the selective router 260 will be able to read the data provided, and establish the call to the PSAP 230. The ESRK or pANI a 10-digit number is also provided to the PSAP CPE 230 for computer aided dispatch and computer aided mapping software to query an automatic location identification database for more information. At a step 23, the E911 voice call is delivered to the call taker/operator at the PSAP 230.

In a step 8, the PSAP CPE 230 sends a query to the ALIDB based on the ESRK, or pANI 10-digit number. In a step 9, the automatic location identification server 270 receives the query and forwards it to the MPC or GMLC 250 for updated information. In a step 10, the MPC or GMLC 250 will in turn send a request for updated location information to the position determining entity or the serving mobile location center 280.

In a step 11, the PDE or SMLC 280 will send a request to the MSC 240 to attain the required information for the calculation of the caller's location including GPS assistance data to help the handset 220 locate the available satellites in its area. In a step 12 the MSC 240 sends the information request on to the cell site servicing the caller. In a step 13, the cell site sends the request on to the sector antenna servicing the caller. In a step 14, the cell sector antenna sends the request to the handset 220.

In a step 15, the handset 220 records signal strength measurement data for the neighboring cell sites and from the global positioning satellites as requested by the PDE or SMLC 280. In a step 16, the handset 220 sends the measurement data on to the sector antenna servicing the caller. In a step 17, the sector antenna servicing the caller forwards the measurement data on to the cell site. In a step 18, the cell site forwards the measurement data on to the MSC 240. In a step 19, the MSC 240 sends the measurement data from the handset 220 on to the PDE or SMLC 280.

In a step 20, the PDE or SMLC 280 utilizes the measurement data from the handset 220 to calculate the coordinates for the caller's location and forwards the information on to the MPC or GMLC 250. In a step 21, the MPC or GMLC 250 sends the updated location information as well as information about the caller back to the ALI server 270 to be populated in the ALIDB for future use.

In a step 22, the ALI server 270 sends the new information that was populated in the ALIDB on to the PSAP's CPE 230 where the data can be utilized by internal software to provide displayed information for the call takers. In a step 24, the E911 caller's location and call back information is delivered to the call taker's/operator's display at the PSAP 230.

With continuing reference to FIG. 2, data collected at data collection points are represented by numbers in hexagonal blocks and are now described. In a hexagonal block 1, data about the cell site sectors is collected for analysis against the data loaded in other elements in the voice path and data delivery path. The data collected includes, without limitation, antenna angle or azimuth, antenna beam width, antenna down tilt, frequency, band class, pseudo random code number ("PN") or scramble code, pseudo random code number (PN increment or scramble code increment), antenna height above ground level, antenna height above ellipsoid, terrain average height, coverage centroid coordinates, and radio frequency information. In a hexagonal block 2, data about the cell site is collected for analysis against the data loaded in other elements in the voice path and data delivery path. The data collected includes, without limitation, cell site common name, cell site number, cell site location coordinates, and cell site physical address.

In a hexagonal block 3, data about the MSC 240 is collected for analysis against the data loaded in other elements in the voice path and data delivery path. The data collected includes, without limitation, switch common name, market identifier, switch identifier, system identifier ("SID"), network identifier ("NID"), vendor, translations database information (cell sites, sectors, digits dialed tables), PSAP default and alternate routing information, MPC or GMLC routing information, pANI or ESRK routing information, PSAP routing information, selective router routing and message format information, primary, secondary, and alternate trunking information, and trunk group member information.

In a hexagonal block 4, data about the MPC or GMLC 250 is collected for analysis against the data loaded in other elements in the voice path and data delivery path. The data collected includes, without limitation, switch common name, market identifier, switch identifier, system identifier, network identifier, vendor, call routing database information (cell sites, sectors), PSAP default and alternate routing information, pANI or ESRK routing information, PSAP routing information, selective router routing and message format information, primary, secondary, and alternate trunking information, trunk group member information, cell site and sector attribute information (physical address, PSAP preferred address, cell site common name, cell site number, sector number), MSC information, and processing logs.

In a hexagonal block 5, data about the selective router 260 is collected for analysis against the data loaded in other elements in the voice path and data delivery path. The data collected includes, without limitation, PSAP default and alternate routing information, pANI or ESRK routing information, PSAP routing information, selective router routing and message format information, primary, secondary, and alternate trunking information, trunk group member information, and processing logs.

In a hexagonal block 6, data about the PSAP CPE 230 is collected for analysis against the data loaded in other elements in the voice path and data delivery path. The data collected includes, without limitation, PSAP default and alternate routing information, pANI or ESRK routing information, PSAP routing information, selective router routing and message format information, primary, secondary, and alternate trunking information, trunk group member information, display configuration information/required formatting, and processing logs.

In a hexagonal block 7, data about the automatic location identification server 270 and automatic location identification database is collected for analysis against the data loaded in other elements in the voice path and data delivery path. The data collected includes, without limitation, ESRK or pANI shell records in the ALIDB and processing logs.

In a hexagonal block 8, data about the position determining entity or the serving mobile location center 280 is collected for analysis against the data loaded in other elements in the voice path and data delivery path. The data collected includes, without limitation, cell site common name, cell site number, sector number, antenna angle or azimuth, antenna beam width, antenna down tilt, frequency, band class, pseudo random code number ("PN") or scramble code, pseudo random code number (PN increment or scramble code increment), antenna height above ground level, antenna height above ellipsoid, terrain average height, coverage centroid coordinates, and radio frequency information.

Figure 3:
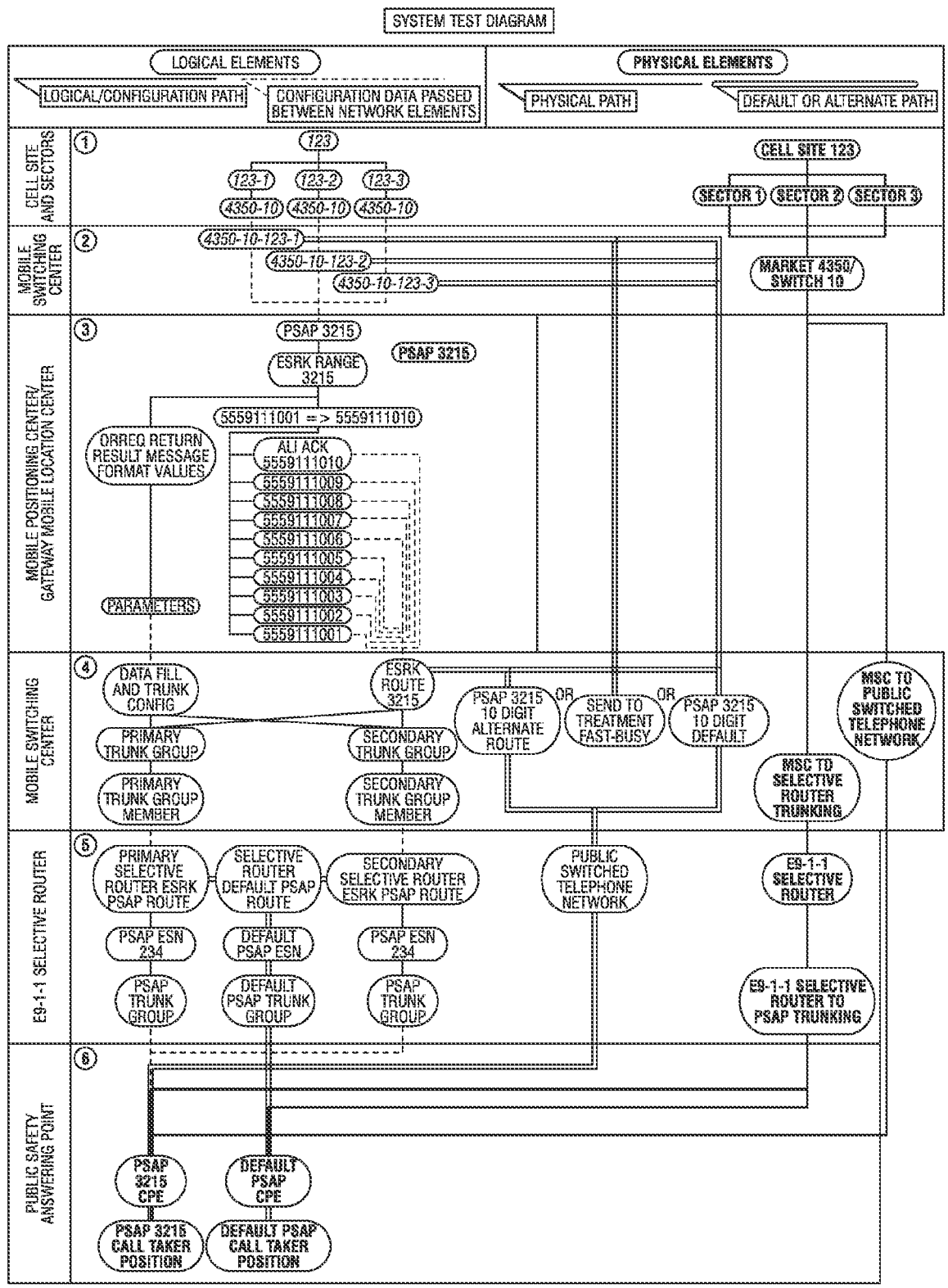
FIG. 3 illustrates a flow diagram of an embodiment of a system test.

Turning now to FIG. 3, illustrated is a flow diagram of an embodiment of a system test. At a step 1, the information in the cell site and sector swim lane or box refers to the data utilized for voice call setup configuration, and the physical elements utilized for the call after it has been setup. During PSAP system testing, 911 test calls are performed on several cell sites and sectors that route to the PSAP being tested.

At a step 2, the MSC will setup the voice calls on the site sectors being tested. Calls will be made to verify that the data is being passed through the process safely. Multiple dial strings (911, *911, #911, and 1911), are utilized to name a few. Different handsets can be tested as well as initialized and non-initialized handsets are also tested. The regular call paths using designated trunking is tested, as are the default/failure scenarios. The MSC also sends the origination request to the mobile positioning center or gateway mobile location center to gain the call routing information from the cell site sector that is servicing the caller to the appropriate PSAP.

At a step 3, the MPC or GMLC will determine where the call should be routed, and over what facilities/voice circuits and return that information back to the MSC so it can set up the call. During PSAP system testing, calls are performed to cycle through the pANI or ESRKs. This process confirms that the configurations within the MSC, MPC, and automatic location information servers are setup correctly. The MPC or GMLC also supplies parameter information for how the voice circuits should be configured when the call is setup to the PSAP. This assures that the data utilized for pulling caller and location data is displayed correctly.

At a step 4, the MPC or GMLC returns the ORREQ return result to the MSC, and it sets up the calls utilizing each of the different call paths available for the PSAP being tested. This would include primary, secondary, alternate, default call paths as well as the calls that fail that are sent to treatment or fast busy. At a step 5, the E911 selective router configuration and physical circuits make up the final leg between the carrier's network, and the PSAP. The PSAP system test procedures complete testing against each of the different routes and the circuits that the routes utilize to complete the call to the PSAP. The routes include both default/failure scenarios, as well as the regular paths utilized to complete calls.

At a step 6, the final swim lane/description box is dedicated to the PSAP and the delivery of the voice call to the designated PSAP via the selective router, the default route through the public switched telephone network to an admin line, or the default routed calls that utilize a default PSAP using the selective router trunking. The data that is collected during PSAP system testing is saved into a dedicated relational database for reference, and comparison against new sites being brought on air routed to the same PSAP utilizing the emergency call routing virtual testing apparatus.

Figure 4:
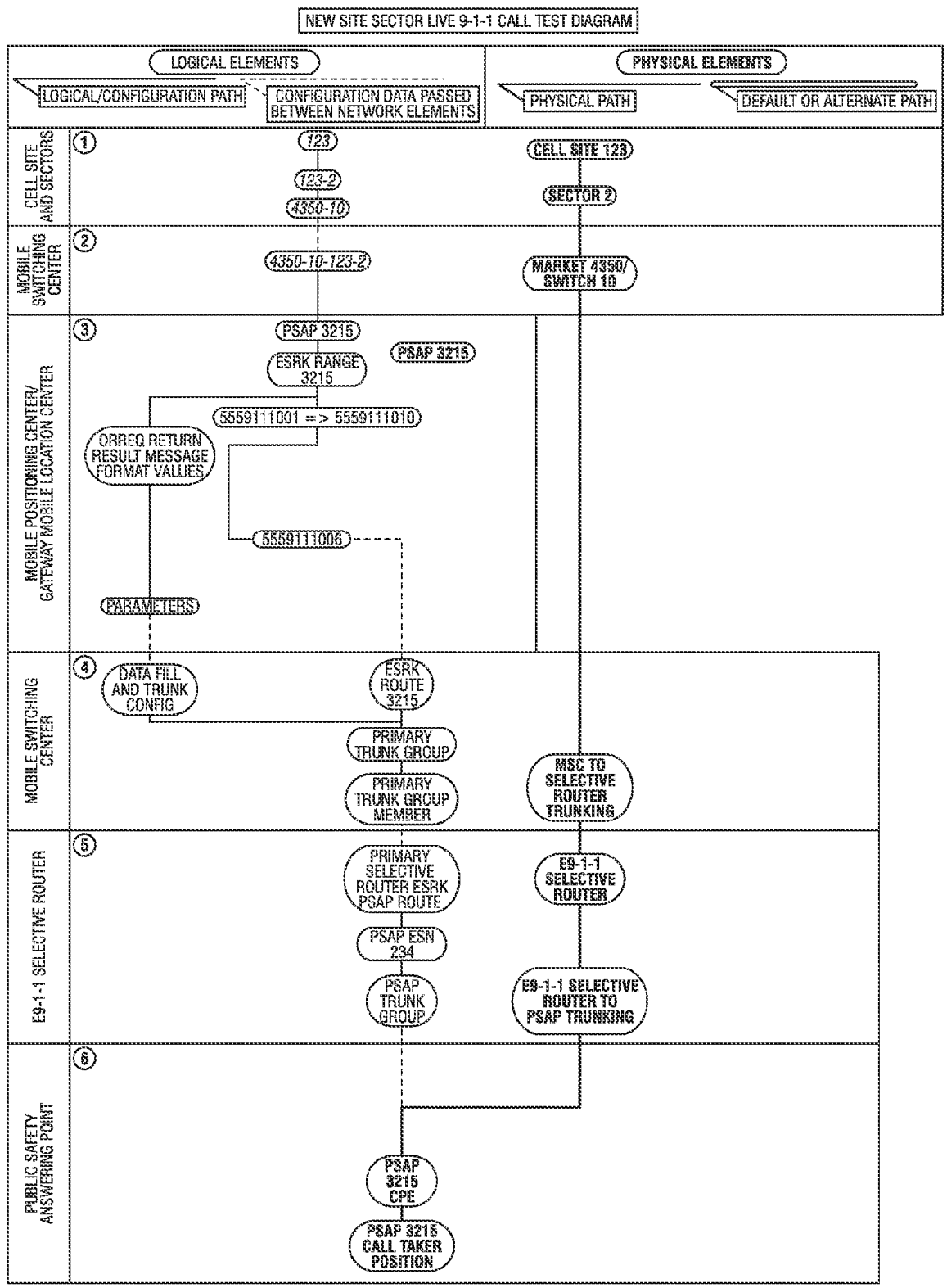
FIG. 4 illustrates flow diagram of an embodiment of a new site sector live E911 call test.

Turning now to FIG. 4, illustrated is flow diagram of an embodiment of a new site sector live E911 call test. The steps illustrated in FIG. 4 are identified with a number in a round circle. At a step 1, the information in the cell site and sector swim lane or box refers to the data utilized for voice call setup configuration, and the physical elements utilized for the call after it has been setup. During PSAP live E911 testing, a 911 test call is performed on the cell site and sector that is being tested. This test will be repeated for each of the sectors of the site. The information that is confirmed will be the same as that shown with the exception of the sector and the pANI/ESRK are possibly different.

At a step 2, the MSC will setup the voice call on the site sector being tested. The call will be made to verify that the data is being passed through the process safely. The dial string tested is 911, and the regular call path using designated trunking is tested. The MSC sends the origination request to the MPC or GMLC to gain the call routing information from the cell site sector that is servicing the caller to the appropriate PSAP.

At a step 3, the MPC or GMLC will determine where the call should be routed, and over what facilities/voice circuits and return that information back to the MSC so it can set up the call. During live E911 call testing, a call is performed to gain a single pANI or ESRK. This process confirms that the configuration within the MSC, MPC, and ALI servers are setup correctly for the cell site sector and pANI/ESRK received. The MPC or GMLC also supplies parameter information for how the voice circuit should be configured when the call is setup to the PSAP. This assures that the data utilized for pulling caller and location data is displayed correctly.

At a step 4, the MPC or GMLC returns the ORREQ return result to the MSC, and it sets up the call utilizing the primary call path available for the PSAP being tested. Any call that utilizes the default routing would be considered a failure and would require that the testing be repeated. At a step 5, the E911 selective router configuration and physical circuits make up the final leg between the carrier's network, and the PSAP. At a step 6, the final swim lane/description box is dedicated to the PSAP and the delivery of the voice call to the designated PSAP via the selective router, the default route through the public switched telephone network to an admin line, or the default routed calls that utilize a default PSAP using the selective router trunking.

Figure 5A:
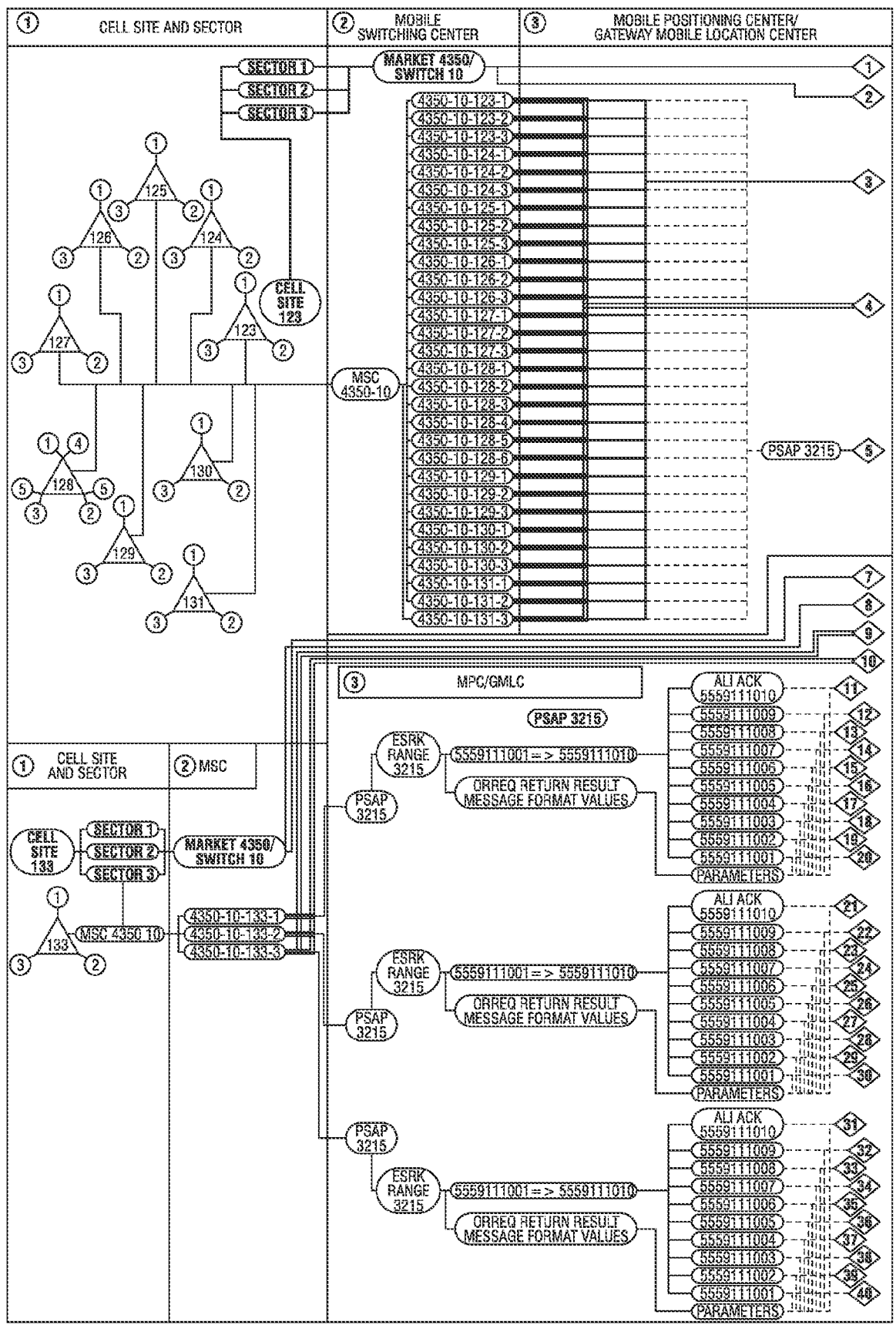
FIGS. 5A, 5B and 5C illustrate flow diagrams demonstrating configuration comparisons of a new cell site and sectors to a deployed cell site and sectors.
Figure 5B:
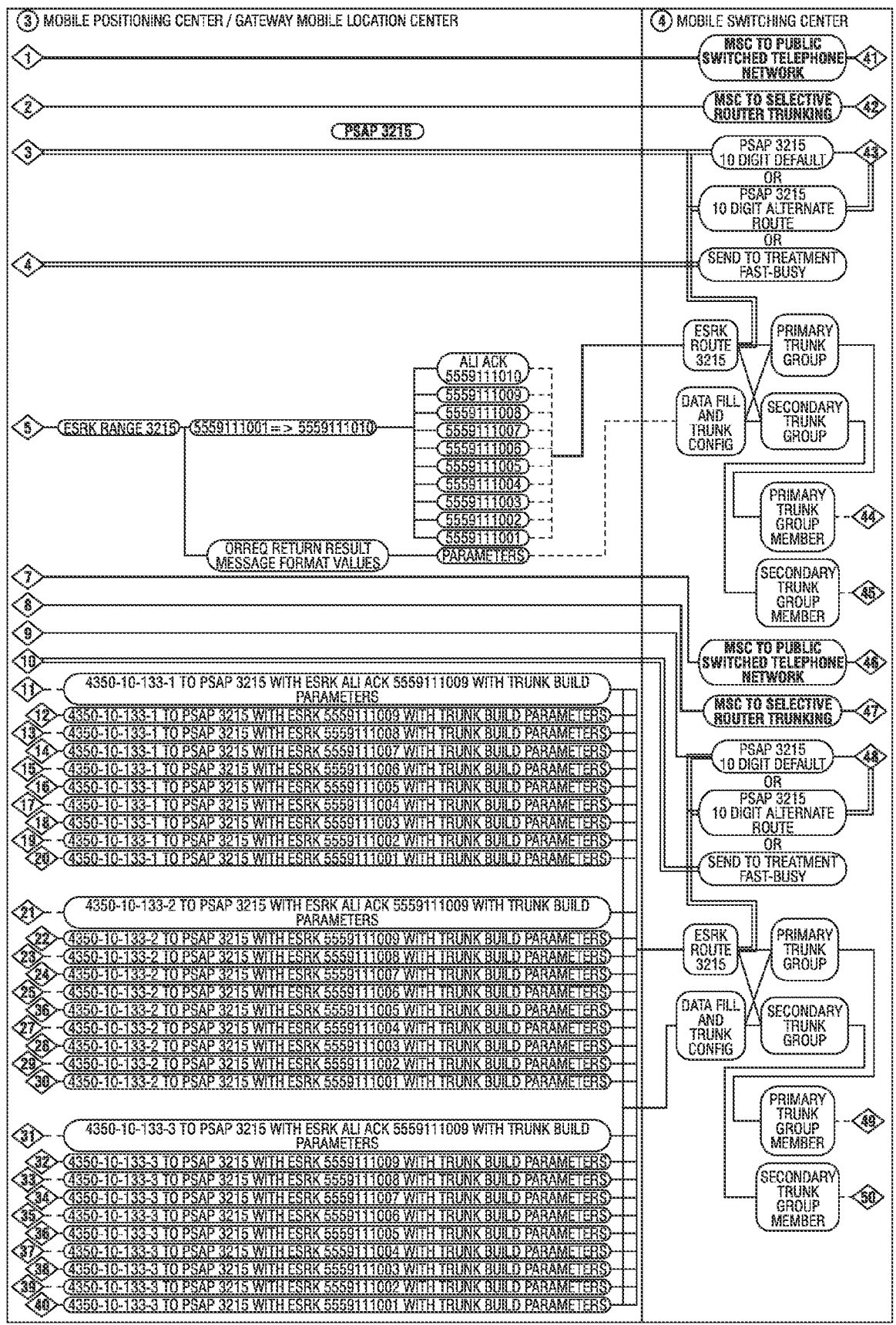
Figure 5C:
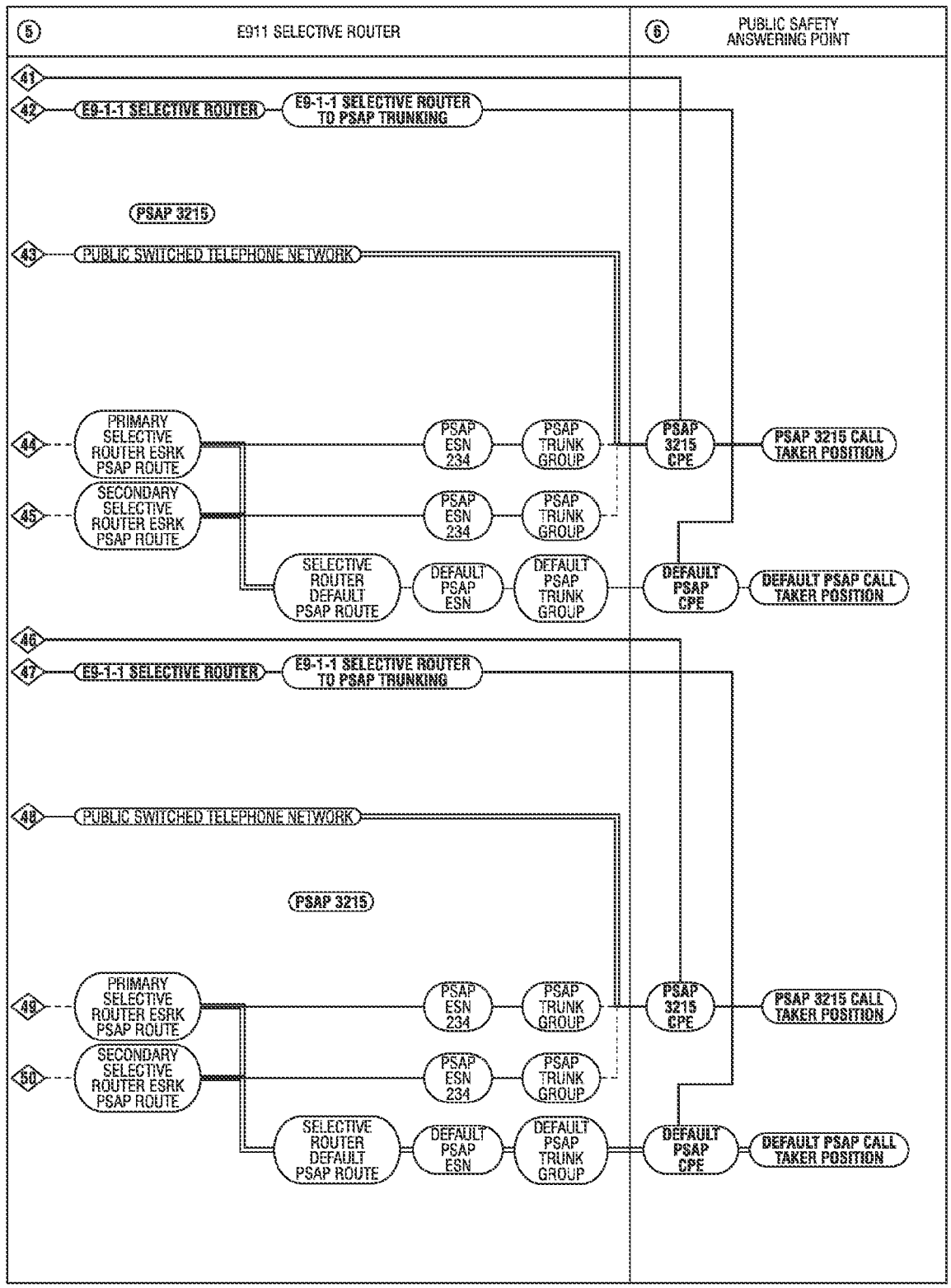

Turning now to FIGS. 5A, 5B and 5C, illustrated are flow diagrams demonstrating configuration comparisons of a new cell site and sectors to a deployed cell site and sectors. The unshaded diamond-shaped symbols illustrated in FIG. 5A with a number are coupled to corresponding shaded diamond-shaped symbols illustrated in FIG. 5B to form a combined drawing. At a section 1 indicated in FIG. 5A with a solidly filled circle, information in the cell site and sector swim lane or box refers to data utilized for voice call setup configuration, and the physical elements utilized for the call after it has been set up. During the comparison of the new cell site and sector to be added to the network and the reference data for the other cell site sectors that route to the same PSAP, log data from live E911 calls is utilized to make sure that calls routing to the PSAP in question are functioning correctly. The configuration of the new cell site and sector (cell site and sector identified with the solidly filled circle in section 1) is compared to the ones that are "live" on the network (cell site and sector identified with the open circle in section 1).

At a section 2 indicated in FIG. 5A with a solidly filled circle, the mobile switching center configuration for the new cell site and sector is compared to the configuration data that has been saved in a database for the other sites that are "live" on the network that route to the same PSAP. The configuration of the MSC for the new cell site and sector (MSC identified with the solidly filled circle in section 2) is compared to the ones that are "live" on the network (MSC identified with the open circle in section 2). The MSC sends the origination request to the mobile positioning center or gateway mobile location center to gain the call routing information from the cell site sector that is servicing the caller to the appropriate PSAP.

At a section 3 indicated in FIG. 5A with a solidly filled circle, the MPC or GMLC configuration data is compared in the same way as the steps previous to this one. The configuration of the MPC or GMLC for the new cell site and sector (MPC or GMLC identified with the solidly filled circle in section 2) is compared to the ones that are "live" on the network (MPC or GMLC identified with the open circle in section 3). The configurations for all pANI or ESRKs are compared to assure that there are no missing elements that would impact E911 call processing.

With respect to FIG. 5C, the unshaded diamond-shaped symbols illustrated in FIG. 5B with a number are coupled to corresponding shaded diamond-shaped symbols illustrated in FIG. 5C to continue forming the combined drawing. In accordance with the section 3, the MPC or GMLC returns the ORREQ return result to the MSC, indicated in FIG. 5B with a section 4 in a solidly filled round circle. At this point, the configuration for linking the pANI/ESRK in the ORREQ to the call path is compared between the live data for the PSAP, and the new site and sectors being added to the network.

At a section 5 indicated in FIG. 5C with a solidly filled round circle, the E911 selective router configuration is compared between the "live" cell site sectors and the new cell site sector. At a section 6 indicated in FIG. 5C with a solidly filled round circle, the final swim lane/description box is dedicated to the PSAP and the delivery of the voice call to the designated PSAP via the selective router, the default route through the public switched telephone network to an administrative line, or the default routed calls that utilize a default PSAP using the selective router trunking. The comparison of the configurations for the call delivery to the call taker are the last ones done. If this final set of comparisons between the "live" sites and the new one being considered are successful, along with all of the comparisons up to this point, then the new cell site and/or sector is turned up and monitored for issues.

Figure 6:
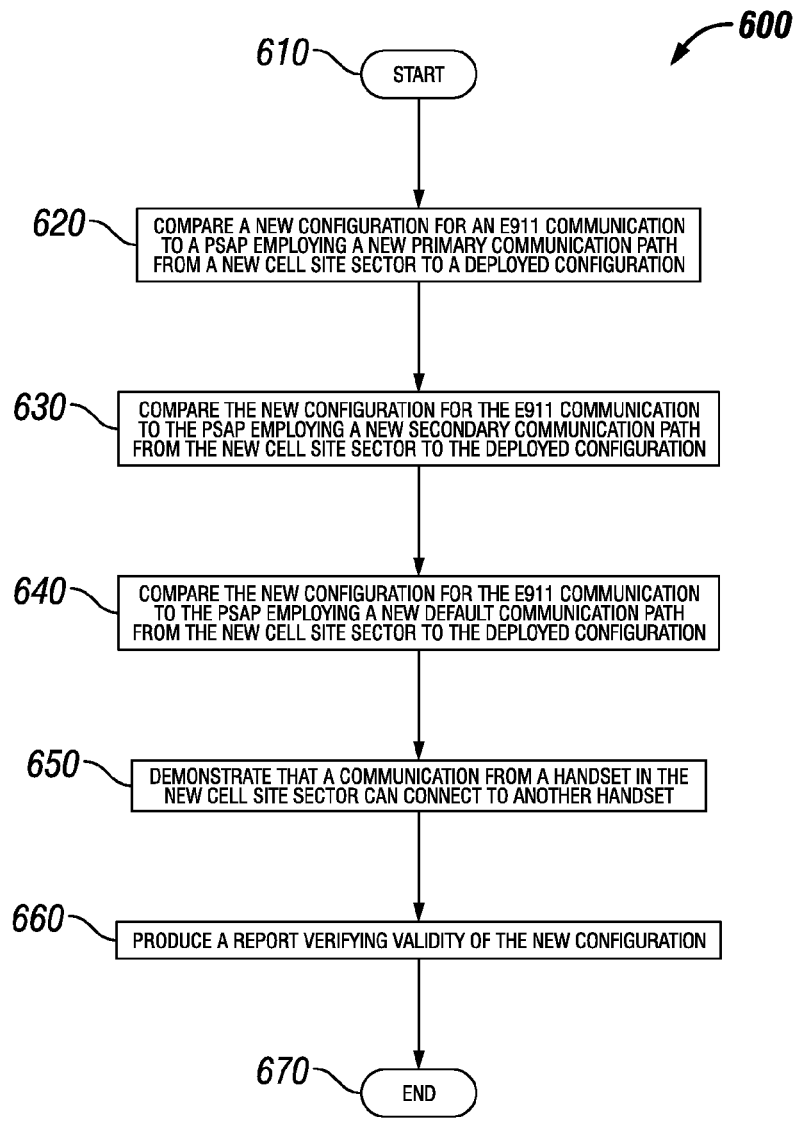
FIG. 6 illustrates a flow diagram of an embodiment of a method of operating a communication system including a public safety answering point.

Turning now to FIG. 6, illustrated is a flow diagram of an embodiment of a method 600 of operating a communication system including a PSAP. The method 600 begins at a start step or module 610. At a step or module 620, the method includes comparing a new configuration for routing an E911 communication (via, for instance, a MSC) to the PSAP employing a new primary communication path from a new cell site sector to a deployed configuration for routing an E911 communication to the PSAP employing a deployed primary communication path from a deployed cell site sector. The new cell site sector may be part of a new cell cite or part of a deployed cell site of the deployed cell site sector. The new configuration may include address data of the new cell site sector.

At a step or module 630, the method 600 includes comparing the new configuration for routing the E911 communication to the PSAP employing a new secondary communication path from the new cell site sector to the deployed configuration for routing the E911 communication to the PSAP employing a deployed secondary communication path from the deployed cell site sector. The method 600 also includes comparing the new configuration for routing the E911 communication to the PSAP employing a new default communication path from the new cell site sector to the deployed configuration for routing the E911 communication to the PSAP employing a deployed default communication path from the deployed cell site sector at a step or module 640.

At a step or module 650, the method 600 includes demonstrating that a communication from a handset in the new cell site sector can connect to another handset. In an embodiment, the demonstrating includes employing a pseudo automatic number identification and/or an emergency services routing key to demonstrate that the communication from the handset in the new cell site sector can connect to the another handset. The method 600 also includes producing a report verifying validity of the new configuration at a step or module 660. The method ends at step or module 670.

Thus, a function of the apparatus is operative in two phases. The first phase takes the configuration for the new cell site sector's voice routing to the PSAP, and compares it with a tested and accepted configuration in use for all other cell site sectors routing to the same PSAP. The configuration for routing calls from the MSC through to the PSAP is the same for the cell site sectors. The only difference is the originating cell site sector. The second phase is to demonstrate that a call can be originated from a handset serviced by the cell site sector through the MSC to another handset. When the two phases are logically linked together, there is proof that a call can be placed from a handset on the cell site sector being added to the network, through the MSC, to the PSAP utilizing all of the provisioned ESRKs, or to pANIs, utilizing the previously tested route sets for diversity of routing and default/failure condition routing.

A solution introduced herein uses big data analytics on a specialized processing node to limit or replace physical emergency (E911) call testing in the deployment of new cell sites into an established network with proven and functioning connectivity to the target PSAP. This is accomplished by utilizing configuration data from the core emergency call processing elements that were physically tested and accepted in the past. When a new PSAP is added to the network, extensive testing is performed on all aspects of voice call and associated location data including call failure scenarios that utilize a default or alternate route to reach a PSAP, or deliver the call to a treatment like fast-busy. This proven configuration data is then compared to the configuration data that has been provisioned into the call elements before the cell site and/or sector is allowed to come on air for call processing. The new cell site and/or sector configuration must match with the reference data and any issues resolved and analyzed again before the cell site and/or sector is allowed on air. Pre- and post-deployment reporting are created for the new cell site and/or sector showing that it was deployed in the accepted configuration. Call log data from the call processing elements are also analyzed to assure that the call routing to the target PSAP is functioning correctly before the new site is deployed, and again after the site is deployed to assure the new site is functioning as expected. This apparatus and process will greatly reduce the extra work load placed on the PSAP call takers and operators as well as lessen the amount of time spent between cell site and/or sector readiness and actual deployment into the network for call processing. The apparatus will also confirm emergency call alternate and default route configurations for the new cell site and/or sector that is not tested during standard deployment call testing.

As described hereinabove, the exemplary embodiments provide both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a processor. In particular, in the case of firmware or software, the exemplary embodiments can be provided as a computer program product including a computer readable storage medium embodying computer program code (i.e., software or firmware) thereon for execution by the computer processor. The computer readable storage medium may be non-transitory (e.g., magnetic disks; optical disks; read only memory; flash memory devices; phase-change memory) or transitory (e.g., electrical, optical, acoustical or other forms of propagated signals-such as carrier waves, infrared signals, digital signals, etc.). The coupling of a processor and other components is typically through one or more busses or bridges (also termed bus controllers). The storage device and signals carrying digital traffic respectively represent one or more non-transitory or transitory computer readable storage medium. Thus, the storage device of a given electronic device typically stores code and/or data for execution on the set of one or more processors of that electronic device such as a controller.

Although the embodiments and its advantages have been described in detail, it should be understood that various changes, substitutions, and alterations can be made herein without departing from the spirit and scope thereof as defined by the appended claims. For example, many of the features and functions discussed above can be implemented in software, hardware, or firmware, or a combination thereof. Also, many of the features, functions, and steps of operating the same may be reordered, omitted, added, etc., and still fall within the broad scope of the various embodiments.

Moreover, the scope of the various embodiments is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized as well. Accordingly, the appended claims are intended to include within their scope such processes, machines, manufacture, compositions of matter, means, methods, or steps.

The invention claimed is:

1. An apparatus operable with a communication system including a public safety answering point (PSAP), comprising:
 a processing circuitry (PR); and
 a memory operatively coupled to the communication system, wherein the PR is configured to:
  collect first configuration data related to a deployed cell site sector;
  collect second configuration data related to a new cell site sector;
  compare the collected second configuration data comprising a new configuration for routing an enhanced 911 (E911) communication to said PSAP employing a new primary communication path from the new cell site sector to the collected first configuration data comprising a deployed configuration for routing an E911 communication to said PSAP employing a deployed primary communication path from the deployed cell site sector; and
  demonstrate a communication from a handset in said new cell site sector to connect to another handset.

2. The apparatus as recited in claim 1, wherein said new cell site sector is part of a new cell site and said deployed cell site sector is part of a deployed cell site.

3. The apparatus as recited in claim 1, wherein said processing circuitry (PR) is further configured to compare said new configuration for routing said E911 communication to said PSAP employing a new secondary communication path from said new cell site sector to said deployed configuration for routing said E911 communication to said PSAP employing a deployed secondary communication path from said deployed cell site sector.

4. The apparatus as recited in claim 1, wherein said processing circuitry (PR) is further configured to compare said new configuration for routing said E911 communication to said PSAP employing a new default communication path from said new cell site sector to said deployed configuration for routing said E911 communication to said PSAP employing a deployed default communication path from said deployed cell site sector.

5. The apparatus as recited in claim 1, wherein said E911 communication from said new cell site sector traverses a mobile switching center (MSC) en route to said PSAP.

6. The apparatus as recited in claim 1, wherein said processing circuitry (PR) employs an emergency services routing key (ESRK) to demonstrate said communication from said handset in said new cell site sector to connect to said another handset.

7. The apparatus as recited in claim 1, wherein said processing circuitry (PR) employs a pseudo automatic number identification (pANI) to demonstrate said communication from said handset in said new cell site sector to connect to said another handset.

8. The apparatus as recited in claim 1, wherein said new configuration comprises address data of said new cell site sector.

9. The apparatus as recited in claim 1, wherein said processing circuitry (PR) is further configured to produce a report verifying a validity of said new configuration.

10. The apparatus as recited in claim 1, wherein said new cell site sector and said deployed cell site sector are part of a deployed cell site.

11. A method of operating a communication system including a public safety answering point (PSAP), comprising:
 collecting first configuration data related to a deployed cell site sector;
 collecting second configuration data related to a new cell site sector;
 comparing the collected second configuration data comprising a new configuration for routing an enhanced 911 (E911) communication to said PSAP employing a new primary communication path from the new cell site sector to the collected first configuration data comprising a deployed configuration for routing an E911 communication to said PSAP employing a deployed primary communication path from the deployed cell site sector; and
 demonstrating a communication from a handset in said new cell site sector to connect to another handset.

12. The method as recited in claim 11, wherein said new cell site sector is part of a new cell site and said deployed cell site sector is part of a deployed cell site.

13. The method as recited in claim 11, further comprising:
 comparing said new configuration for routing said E911 communication to said PSAP employing a new secondary communication path from said new cell site sector to said deployed configuration for routing said E911 communication to said PSAP employing a deployed secondary communication path from said deployed cell site sector.

14. The method as recited in claim 11, further comprising:
 comparing said new configuration for routing said E911 communication to said PSAP employing a new default communication path from said new cell site sector to said deployed configuration for routing said E911 communication to said PSAP employing a deployed default communication path from said deployed cell site sector.

15. The method as recited in claim 11, wherein said E911 communication from said new cell site sector traverses a mobile switching center (MSC) en route to said PSAP.

16. The method as recited in claim 11, wherein said demonstrating comprises employing an emergency services routing key (ESRK) to demonstrate said communication from said handset in said new cell site sector to connect to said another handset.

17. The method as recited in claim 11, wherein said demonstrating comprises employing a pseudo automatic number identification (pANI) to demonstrate said communication from said handset in said new cell site sector to connect to said another handset.

18. The method as recited in claim 11, wherein said new configuration comprises address data of said new cell site sector.

19. The method as recited in claim 11, further comprising:
 producing a report verifying a validity of said new configuration.

20. The method as recited in claim 11, wherein said new cell site sector and said deployed cell site sector are part of a deployed cell site.

\* \* \* \* \*